United States Patent
Sugimoto

(10) Patent No.: US 9,120,455 B2
(45) Date of Patent: Sep. 1, 2015

(54) AIRBAG AND AIRBAG DEVICE

(75) Inventor: Shinichi Sugimoto, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 62 days.

(21) Appl. No.: 14/119,296

(22) PCT Filed: May 22, 2012

(86) PCT No.: PCT/JP2012/062974
§ 371 (c)(1),
(2), (4) Date: Nov. 21, 2013

(87) PCT Pub. No.: WO2012/165202
PCT Pub. Date: Dec. 6, 2012

(65) Prior Publication Data
US 2014/0091562 A1    Apr. 3, 2014

(30) Foreign Application Priority Data
Jun. 1, 2011  (JP) .................................. 2011-123088

(51) Int. Cl.
*B60R 21/231*  (2011.01)
*B60R 21/237*  (2006.01)

(52) U.S. Cl.
CPC .............. *B60R 21/231* (2013.01); *B60R 21/237* (2013.01); *B60R 2021/23146* (2013.01)

(58) Field of Classification Search
CPC .............. B60R 21/233; B60R 21/2334; B60R 21/2342; B60R 21/237; B60R 2021/23146
See application file for complete search history.

(56) References Cited

U.S. PATENT DOCUMENTS

| | | | | |
|---|---|---|---|---|
| 5,333,903 | A | * | 8/1994 | Eyrainer et al. ............ 280/743.1 |
| 5,482,318 | A | * | 1/1996 | Sollars, Jr. ................. 280/743.1 |
| 5,697,640 | A | * | 12/1997 | Lalonde ..................... 280/743.1 |
| 6,142,517 | A | * | 11/2000 | Nakamura et al. ............ 280/739 |
| 6,270,113 | B1 | | 8/2001 | Wipasuramonton et al. |
| 8,042,831 | B2 | * | 10/2011 | Hoffman et al. ........... 280/730.1 |
| 8,322,747 | B2 | * | 12/2012 | Shankar ....................... 280/729 |
| 2002/0047253 | A1 | | 4/2002 | Rasch et al. |
| 2003/0030255 | A1 | * | 2/2003 | Igawa et al. ................ 280/730.1 |

(Continued)

FOREIGN PATENT DOCUMENTS

| | | |
|---|---|---|
| DE | 19643052 A * | 9/1997 |
| DE | 100 18 170 A1 | 10/2001 |

(Continued)

OTHER PUBLICATIONS

International Search Report; PCT/JP2012/062974; Jul. 17, 2012; 2 pages.

*Primary Examiner* — Ruth Ilan
(74) *Attorney, Agent, or Firm* — Foley & Lardner LLP

(57) ABSTRACT

Provided are an airbag and an airbag device that are capable of reducing impact on an occupant at an out of position while providing restraining ability with respect to the occupant in a normally seated state. An airbag device includes an airbag 2 that is normally folded and accommodated in a seat 11 of a vehicle and that is inflated and deployed in an emergency, and an inflator 3 that supplies gas to the airbag 2. The airbag 2 includes a bag member 21 that is formed of a base cloth 2*a*, and a plurality of pleats 22 that are formed at the bag member 21. The pleats 22 have a crease portion 23 in a front-back direction of the vehicle to allow the gas to escape to the crease portion 23 upon loading from the front-back direction of the vehicle when the bag member 21 is inflated and deployed.

10 Claims, 11 Drawing Sheets

(56) References Cited

U.S. PATENT DOCUMENTS

| | | |
|---|---|---|
| 2006/0028009 A1* | 2/2006 | Hasebe et al. ............ 280/743.1 |
| 2008/0290637 A1 | 11/2008 | Mueller et al. |
| 2010/0052300 A1 | 3/2010 | Sugimoto |
| 2011/0049852 A1 | 3/2011 | Kibat et al. |
| 2011/0241323 A1* | 10/2011 | Naganawa et al. ........... 280/731 |
| 2013/0056963 A1* | 3/2013 | Fischer et al. ............ 280/728.1 |

FOREIGN PATENT DOCUMENTS

| | | | |
|---|---|---|---|
| DE | 10 2010 039 882 A1 | | 3/2011 |
| FR | 2824029 A1 | * | 10/2002 |
| GB | 2318797 A | * | 5/1998 |
| JP | 09-058392 | | 3/1997 |
| JP | 2001-354103 A | | 12/2001 |
| JP | 2003-501303 A | | 1/2003 |
| JP | 2004-217184 A | | 8/2004 |
| JP | 2005-153726 A | | 6/2005 |
| JP | 2006-224817 A | | 8/2006 |
| JP | 2007-223400 A | | 9/2007 |
| JP | 2008-155918 A | | 7/2008 |
| JP | 2009-035055 A | | 2/2009 |
| JP | 2009-154751 A | | 7/2009 |
| JP | 2010-052562 A | | 3/2010 |
| JP | 2010-535121 A | | 11/2010 |
| JP | 2011-057208 A | | 3/2011 |
| JP | 2011-068184 A | | 4/2011 |
| WO | WO-00/46076 A1 | | 8/2000 |
| WO | WO-2008/122346 A1 | | 10/2008 |

* cited by examiner

VEHICLE FRONT-BACK DIRECTION

VEHICLE FRONT-BACK DIRECTION

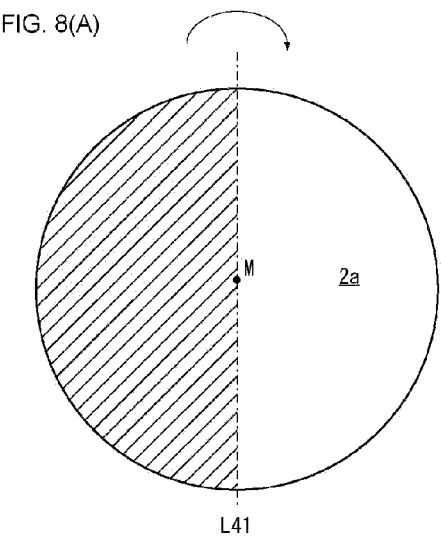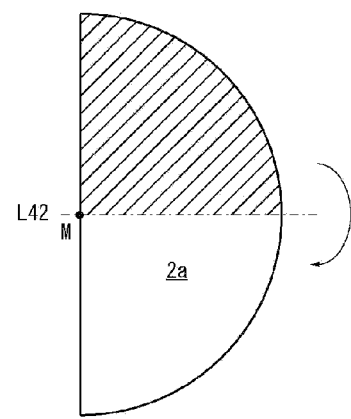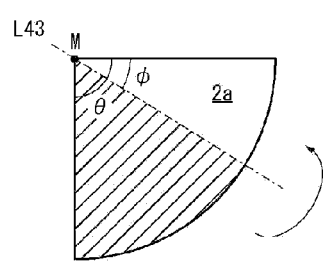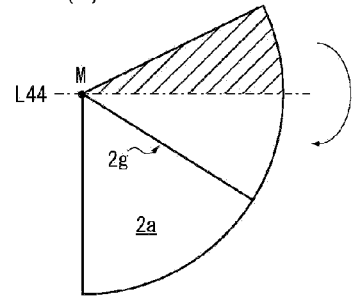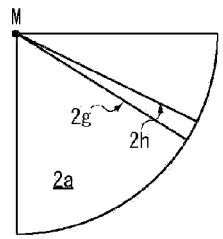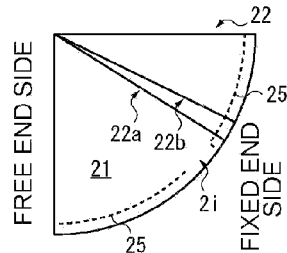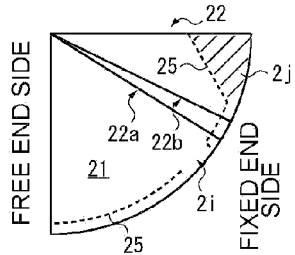

AIRBAG AND AIRBAG DEVICE

FIELD OF THE INVENTION

The present invention relates to an airbag and an airbag device, and, particularly, to an airbag and an airbag device that are suitable for a side airbag that is inflated and deployed at a location between an occupant and a door.

BACKGROUND OF THE INVENTION

In general, a vehicle, such as an automobile, is provided with an airbag device for absorbing impact on an occupant by inflating and deploying an airbag in a vehicle in an emergency, such as a collision or a sudden deceleration. In general, such an airbag device includes an airbag and an inflator. The airbag is normally folded and accommodated in a structural member of the vehicle, and is inflated and deployed in an emergency. The inflator supplies gas to the airbag.

For example, in the case of a side airbag device, the airbag device is built in a seat back of a seat on which an occupant sits; and, at the time of a collision of a vehicle or a sudden deceleration, an airbag breaks through or pushes through the seat back, is released towards the front in a vehicle, and is quickly inflated and deployed at a location between an occupant and a door of the vehicle. Various structures of such an airbag have already been proposed (see PTL 1 to PTL 4).

For example, the airbag in PTL 1, instead of having a three-dimensional structure, has a structure in which inflation assisting means is formed at peripheral edge portions of a pair of panels of the airbag by forming a fold region that is folded into of an inflation region. Such inflation assisting means having a planar panel structure is capable of assisting the inflation in a vehicle lateral direction at a portion of the inflation region and partly increasing a deployment width.

The airbag in PTL 2 includes a substantially hermetically sealed space in an interior thereof as a result of folding and sewing one base cloth having a predetermined shape so as to bring together end portions of the entire periphery of the base cloth. According to such a structure, it is possible to make it unnecessary to perform an outer periphery stitching step and to reduce manufacturing costs.

The airbag in PTL 3 includes a tube that is disposed adjacent to an inflatable cushion and that is disposed at one of a bottom portion and rear portion so as to extend along the airbag before the cushion is completely inflated by an inflation gas. Such a structure makes it possible to supply gas to a cushion section after the tube is first completely inflated and to reduce impact on an occupant at what is called an out of position (position that is displaced from a standard seating position).

The airbag in PTL 4 includes a rear chamber, formed of a tube panel; a front chamber, formed of a cushion section; and a ventilation system including a ventilation opening and a blocking panel. The ventilation opening is disposed in the front chamber. The blocking panel is capable of covering and uncovering the ventilation opening. Such a structure makes it possible to discharge gas to the outside by causing the ventilation opening to be uncovered when the inflation of the front chamber is prevented, and to reduce impact on an occupant at what is called an out of position.

CITATION LIST

Patent Literature

PTL 1: Japanese Patent No. 4345684
PTL 2: Japanese Unexamined Patent Application Publication No. 2010-52562
PTL 3: Japanese Unexamined Patent Application Publication (Translation of PCT Application) No. 2003-501303
PTL 4: Japanese Unexamined Patent Application Publication (Translation of PCT Application) No. 2010-535121

SUMMARY OF INVENTION

Technical Problem

As described in PTL 3 and PTL 4 mentioned above, consideration is made to reduce gas pressure that inflates the airbag and to discharge gas that inflates the airbag to the outside when the airbag is inflated and deployed with respect to an occupant that is at an out of position (for example, a state in which a portion of a body leans on a door of a vehicle). However, although such methods are capable of reducing impact on an occupant at the out of position, energy absorbing ability and deployment speed are reduced with respect to the occupant in a normally seated state (state in which the occupant is seated and the back of the occupant leans against a seat back), thereby making it difficult to maintain restraining performance of the airbag.

As described in PTL 1 and PTL 2 mentioned above, the airbag provided with a fold section and the airbag formed by folding and stitching the entire periphery of a base cloth are formed so as to exhibit restraining performance with respect to an occupant in a normally seated state.

The present invention has been conceived in view of such problems, and provides an airbag and an airbag device that are capable of reducing impact on an occupant in an out of position while providing restraining performance with respect to the occupant in a normally seated state.

Solution to Problem

The present invention provides an airbag that is normally folded and accommodated in a structural member of a vehicle and that is inflated and deployed by a supply of gas in an emergency. The airbag includes a bag member that is formed of a base cloth, and a pleat or a plurality of pleats that are formed at the bag member. In the airbag, the pleat or pleats have a crease portion in a front-back direction of the vehicle to allow the gas to escape to the crease portion upon loading from the front-back direction of the vehicle when the bag member is inflated and deployed.

The present invention provides an airbag device comprising an airbag that is normally folded and accommodated in a structural member of a vehicle and that is inflated and deployed in an emergency; and an inflator that supplies gas to the airbag. The airbag includes a bag member that is formed of a base cloth, and a pleat or a plurality of pleats that are formed at the bag member. In the airbag, the pleat or pleats have a crease portion in a front-back direction of the vehicle to allow the gas to escape to the crease portion upon loading from the front-back direction of the vehicle when the bag member is inflated and deployed.

In the airbag and the airbag device, the pleat or pleats may be formed by folding the base cloth in two, and then folding back and forth and sewing an open edge of the base cloth so that a vertex is formed at a central portion at a fold edge of the base cloth.

The pleats may be formed to have widths different from each other when the airbag has the plurality of pleats. A sewn portion that forms the pleat or pleats may be inclined towards a free end from a fixed end of the bag member. A sewn portion that forms the pleat or pleats may concurrently serve as a sewn portion that forms the bag member. For example, the vertex may be included in a central region of three equally divided regions in a length of the base cloth in an up-down direction of the vehicle.

An external shape of the base cloth is a substantially star shape. An area when the bag member is spread in a plane after the bag member including the pleat or pleats has been formed is 0.25 to 0.35 times an area when the base cloth is spread in a plane before the bag member is formed. The crease portion has a length that is greater than or equal to half a length of the inflated and deployed bag member in the front-back direction of the vehicle. For example, the bag member may be used as a side airbag that is inflated and deployed at a location between an occupant and a door of the vehicle.

Advantageous Effects of Invention

According to the airbag and the airbag device of the present invention, by forming a pleat or pleats so as to have a crease portion extending in the front-back direction of a vehicle when the bag member is inflated and deployed, gas can be supplied to the bag member while allowing gas that inflates and deploys the bag member to escape to the crease portion and inflating the crease portion so as to stretch it in the case where a load is generated in the front-back direction of the vehicle. Therefore, when the crease portion is used as a preliminary inflating portion, even if, for example, the airbag is inflated and deployed towards an occupant at the out of position, it is possible to inflate and deploy the bag member so as to surround the occupant at the out of position while avoiding the occupant, and to reduce impact.

Even if a load is generated from the left-right direction of the vehicle without the crease portion being stretched under normal gas pressure that inflates and deploys the bag member, the crease portion can function as an energy absorbing member without being stretched as a result of being sandwiched in the bag member. Therefore, even if the crease portion is formed, it is possible to maintain the energy absorbing ability and deployment speed of the airbag at a location between the occupant in the normally seated state and a vehicle structural member.

Therefore, according to the airbag and the airbag device of the above-described invention, it is possible to reduce impact on the occupant at the out of position while providing restraining performance with respect to the occupant in the normally seated state.

By forming a pleat by folding an open edge back and forth with the vertex of the central portion being a base point, it is possible to inflate and deploy the airbag so that the pleat is wound during the inflation and deploying of the airbag, and to easily form the crease portion extending in the front-back direction of the vehicle with the sewn portion being a base point. In addition, such a structure makes it possible to sew the pleat in a step that is the same as the step for sewing the bag member.

By causing the widths of the pleats to differ from each other, even if a plurality of pleats are formed, the number of folds of the base cloth can be changed in stages, portions that suddenly become thick or thin can be eliminated, and the effort required in the sewing process can be reduced.

By causing the sewn portion that forms the pleat or pleats to incline forwardly, a portion of the base cloth can be pushed in towards the inner side of the bag member when the airbag is inflated and deployed, and the crease portion can be easily formed by a three-dimensional tether effect of the sewn portion. In addition, by adjusting the inclination angle, the length and depth of the crease portion can be adjusted.

By sewing the pleat or pleats and the bag member by a common sewing operation, it is possible to sew both the pleat or pleats and the bag member by one sewing operation, simplify the sewing step, and increase the sewing efficiency.

By setting the vertex, serving as the base point of the pleats, within a range including a predetermined central region, it is possible to form a crease portion that is in accordance with, for example, the capacity and type of the airbag and the type of vehicle.

By forming the base cloth with a substantially star shape, the bag member having a shape that causes the sewn portion at the pleat or pleats to be inclined forwardly can be formed so that wasteful portions of the base cloth are not provided.

By setting (reducing) the area of the bag member including the pleat or pleats to an area within a predetermined range of the area of the original base cloth, it is possible to form a crease portion that is suitable for the capacity of the airbag.

By forming the length of the crease portion to a length that is greater than or equal to half the length of the bag member in the front-back direction of the vehicle, the preliminary inflating portion that acts upon an occupant at the out of position can be made large, and impact on the occupant at the out of position can be more effectively reduced.

By using the bag member as a side airbag, the occupant at the out of position is effectively acted upon in the vehicle front-back direction of the airbag, and the occupant in the normally seated state is effectively acted upon in the vehicle left-right direction of the airbag.

BRIEF DESCRIPTION OF THE DRAWINGS

FIG. 1 shows an airbag device according to a first embodiment of the present invention, wherein

FIG. 2 shows in detail the airbag shown in FIG. 1(A), wherein

FIG. 3 shows actions of the airbag shown in FIG. 1, wherein

FIG. 4 shows a method for forming pleats, wherein

FIG. 5 shows a first modification of the method for forming pleats, wherein

FIG. 6 shows a second modification of the method for forming pleats, wherein

FIG. 7 shows a third modification of the method for forming pleats, wherein

FIG. 8 shows a fourth modification of the method for forming pleats, wherein FIG. 8(A) shows a spreading step in a plane, FIG. 8(B) shows a step for folding a base cloth in two, FIG. 8(C) shows a first folding step, FIG. 8(D) shows a second folding step, FIG. 8(E) shows a third folding step, and FIGS. 8(F) and 8(G) each show a sewing step.

FIG. 9 shows a fifth modification of the method for forming pleats, wherein

FIG. 10 shows an airbag device according to a second embodiment of the present invention, wherein

FIG. 11 shows an airbag device according to a third embodiment of the present invention, wherein

DETAILED DESCRIPTION OF THE PREFERRED EMBODIMENTS

Figure 1A:
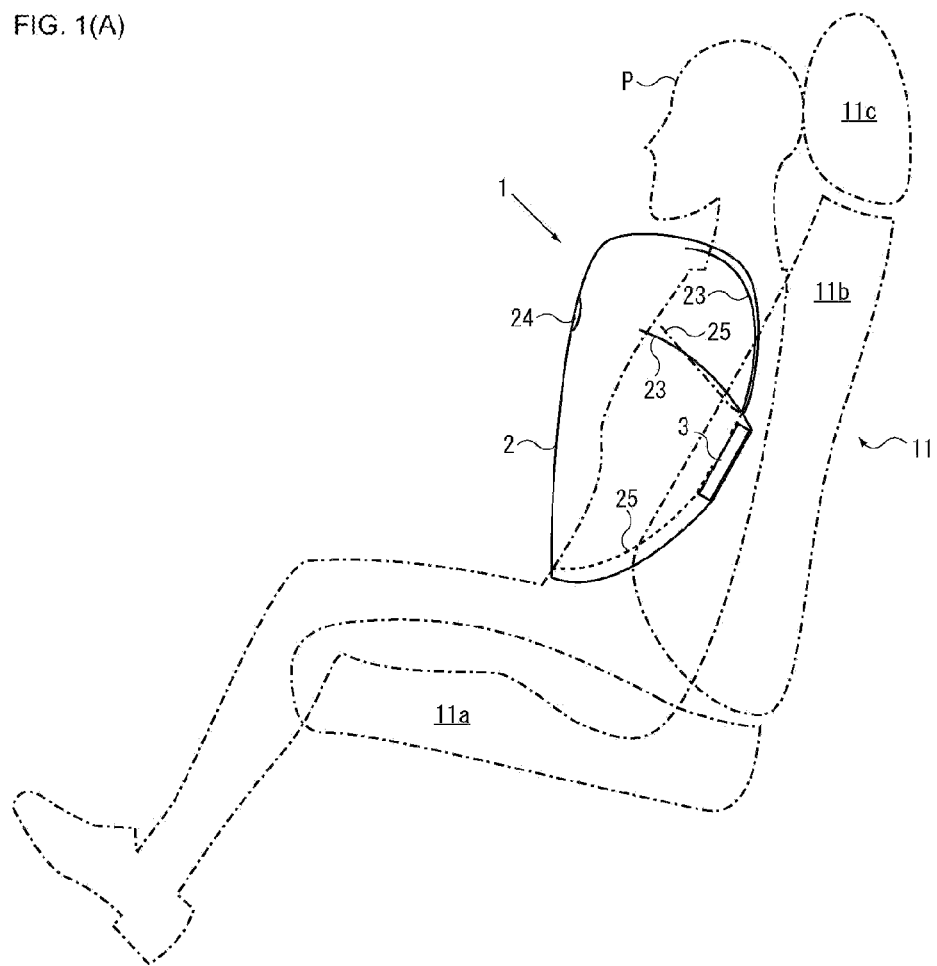
FIG. 1(A) is a schematic side view showing an inflated and deployed state.
Figure 1B:
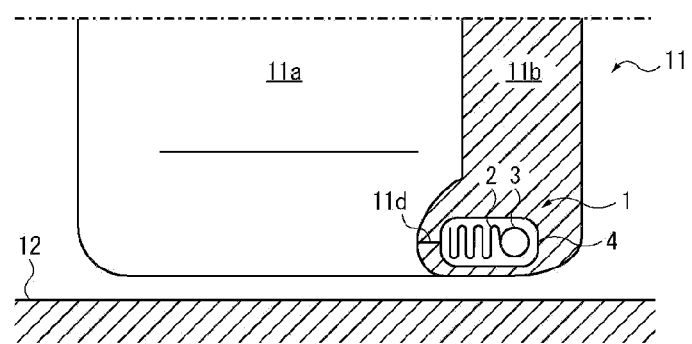
FIG. 1(B) is a schematic sectional view showing an accommodated state.
Figure 2A:
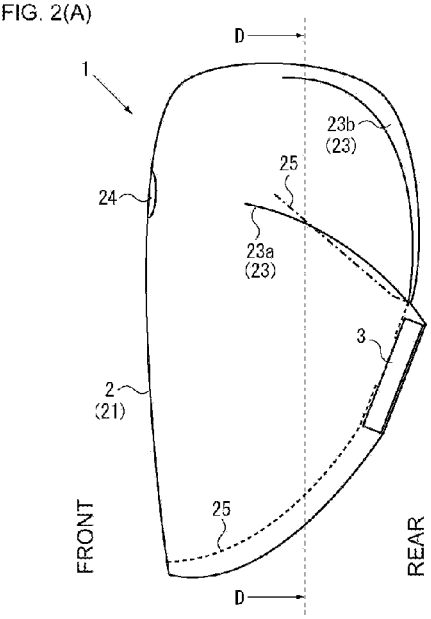
FIG. 2(A) is a vehicle-body-side side view.
Figure 2B:
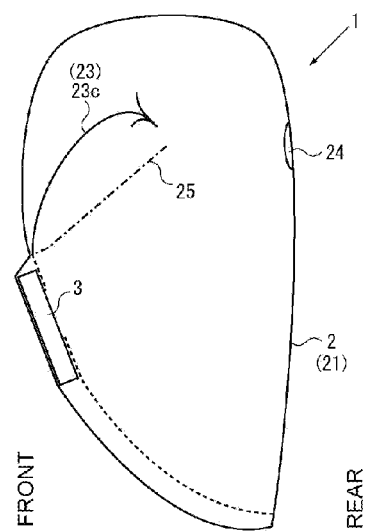
FIG. 2(B) is an occupant-side side view.
Figure 2C:
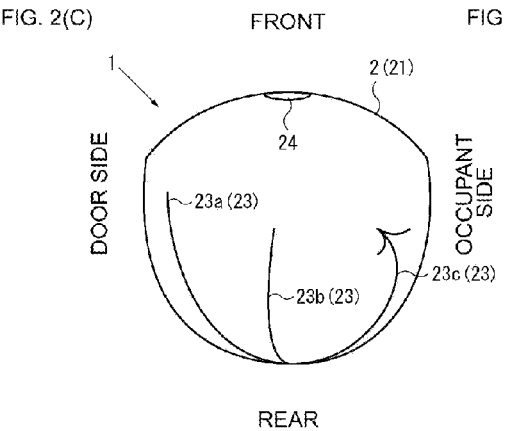
FIG. 2(C) is a top view.
Figure 2D:
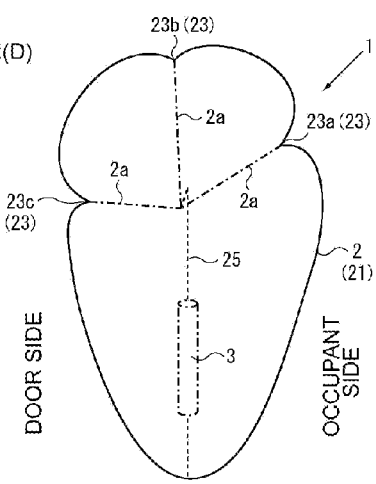
FIG. 2(D) is a sectional view taken along line D-D in FIG. 2(A).
Figure 3A:
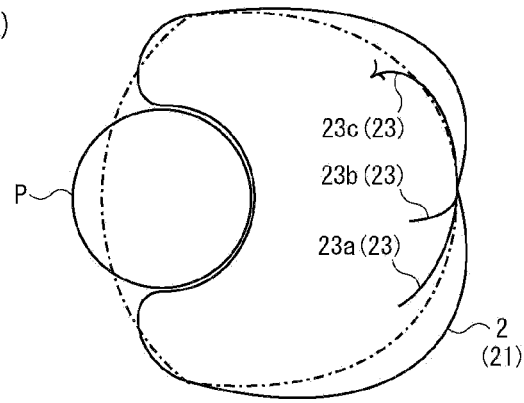
FIG. 3(A) shows an out-of-position situation.
Figure 3B:
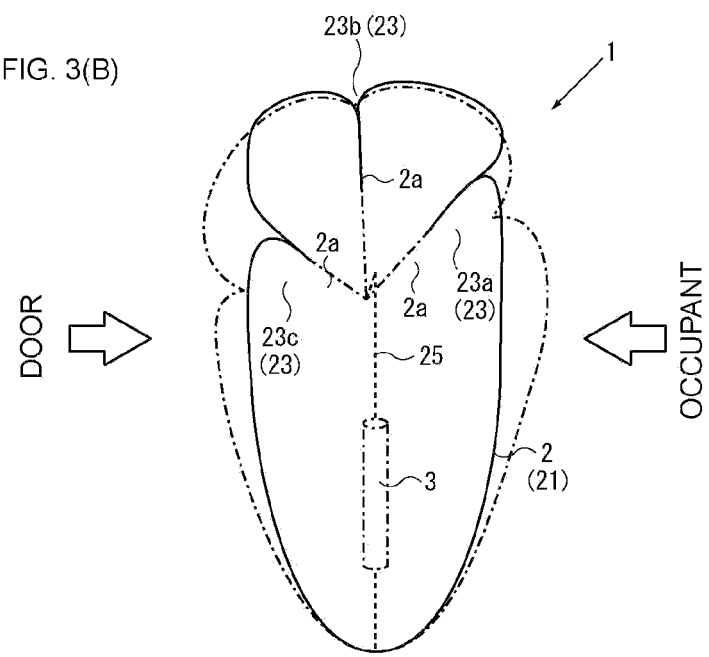
FIG. 3(B) shows a normally-seated-state situation.

Airbag devices according to embodiments of the present invention are hereunder described using FIGS. 1 to 11. FIG. 1 shows an airbag device according to a first embodiment of the present invention, wherein FIG. 1(A) is a schematic side view showing an inflated and deployed state, and FIG. 1(B) is a schematic sectional view showing an accommodated state. FIG. 2 shows in detail the airbag shown in FIG. 1(A), wherein FIG. 2(A) is a vehicle-body-side side view, FIG. 2(B) is an occupant-side side view, FIG. 2(C) is a top view, and FIG. 2(D) is a sectional view taken along line D-D in FIG. 2(A). FIG. 3 shows actions of the airbag shown in FIG. 1, wherein FIG. 3(A) shows an out-of-position situation, and FIG. 3(B) shows a normally-seated-state situation. FIG. 4 shows a method for forming pleats, wherein FIG. 4(A) shows a spreading step in a plane, FIG. 4(B) shows a step for folding a base cloth in two, FIG. 4(C) shows a first folding step, FIG. 4(D) shows a second folding step, FIG. 4(E) shows a third folding step, and FIG. 4(F) shows a sewing step.

As shown in FIGS. 1 to 4, an airbag device 1 according to a first embodiment of the present invention includes an airbag 2 that is normally folded and accommodated in a seat 11 of a vehicle and is inflated and deployed in an emergency, and an inflator 3 that supplies gas to the airbag 2. The airbag 2 includes a bag member 21 that is formed of a base cloth 2a, and a plurality of pleats 22 that are formed at the bag member 21. The pleats 22 have crease portions in a front-back direction of the vehicle to allow the gas to escape to the crease portion 23 upon loading from the front-back direction of the vehicle when the bag member 21 is inflated and deployed. In the description of the embodiment, the bag member 21 mounted to the airbag device 1 is called the airbag 2.

For example, as shown in FIGS. 1(A) and 1(B), the airbag device 1 is a side airbag device, and is mounted to a seat 11, such as a front seat (driver's seat, passenger's seat) or a rear seat. In such a case, the bag member 21 is used as the airbag 2 (side airbag) that is inflated and deployed at a location between an occupant P and a door 12 of the vehicle. More specifically, the seat 11 includes a sitting portion 11a where the occupant P sits, a seat back 11b that supports the back of the occupant P, and a head rest 11c that supports the head of the occupant P. The airbag device 1 is mounted to the seat back 11b.

As shown in FIG. 1(B), while the airbag 2 and the inflator 3 are accommodated in an airbag case 4, the airbag device 1 is accommodated in a vehicle-door-12 side of the seat back 11b. The seat back 11b includes an expected cleavage portion 11d. It is normally kept in a closed state. During collision of the vehicle or a sudden deceleration, the expected cleavage portion 11d is deformed to an open state when the airbag 2 breaks or pushes through it, so that the airbag 2 is released into the interior of the vehicle.

The inflator 3 is a gas generator that generates gas to be supplied to the airbag 2. Its external shape is, for example, a substantially columnar shape. The inflator 3 is connected to a mounting portion of the airbag 2 with a fastener, such as a bolt; and is, along with the airbag 2, accommodated in the airbag case 4. When the airbag 2 is to be accommodated in the airbag case 4, the airbag 2 is folded by a predetermined folding method (such as bellow folding, roller folding, or a combination of these), and the inflator 3 is secured to the airbag case 4.

The inflator 3 is connected to an electronic control unit (ECU) (not shown), and is controlled on the basis of a measurement value of, for example, an acceleration sensor. If the ECU senses or predicts a sudden deceleration or a collision of a vehicle, the inflator 3 is ignited by an ignition current from the ECU, a chemical agent stored in the inflator 3 is burned to produce a gas, and the gas is supplied to the airbag 2.

As shown in FIG. 1(B), the airbag 2 is normally folded and accommodated in the seat 11 of the vehicle. As shown in FIG. 1(A), in an emergency, the airbag 2 is inflated and deployed by the supply of gas thereto. The illustrated airbag 2 has a size that corresponds to the size from the shoulder to stomach of the occupant P when the airbag 2 is inflated and deployed. As shown in FIG. 1(A) and FIGS. 2(A) to 2(D), the airbag 2 is formed so as to be inflated and deployed from the rear towards the front of the vehicle, and so as to have a predetermined thickness in a direction that is substantially perpendicular to the direction in which the airbag 2 is inflated and deployed (that is, in a left-right direction of the vehicle or a width direction of the airbag 2). A vent hole 24 that adjusts internal pressure by releasing the gas in the airbag 2 to the outside is formed in the front of the airbag 2. The size of the vent hole 24 and number of vent holes 24 are set as appropriate in accordance with the conditions of the airbag 2, such as the capacity and the internal pressure of the airbag 2.

The inflated and deployed airbag 2 includes a plurality of crease portions 23. In the illustrated embodiment, the airbag 2 includes three crease portions 23, that is, a first crease portion 23a, a second crease portion 23b, and a third crease portion 23c, in that order from the side of the door 12 to the side of the occupant P. The crease portions 23 are formed so as to extend from the rear towards the front of the airbag 2. For example, the crease portions 23 have lengths that are greater than or equal to half the length of the inflated and deployed airbag 2 (bag member 21) in the front-back direction of the vehicle. Conditions of the crease portions 23, such as the number of crease portions 23, the length of the crease portions 23, and the depth of the crease portions 23, are set in accordance with the conditions of the airbag 2, such as the capacity and internal pressure of the airbag 2; and can be adjusted by the structure of the pleats 22 (described later).

Here, the case in which the airbag 2 including the crease portions 23 is subjected to a load from the direction in which the crease portions 23 are formed, that is, the front-back direction of the vehicle, is described. In FIG. 3(A), it is assumed that the occupant P is at an out of position. When the occupant P exists in the front-back direction of the vehicle that corresponds to the direction in which the airbag 2 is inflated and deployed, the airbag 2 comes into contact with the occupant P and cannot be inflated in the forward direction, as a result of which gas cannot escape. However, in the embodiment, such gas can escape to the crease portions 23 of the airbag 2, so that the internal pressure of the crease portions 23 is increased, the crease portions 23 are stretched, and portions of the airbag 2 around the crease portions 23 are inflated. That is, the crease portions 23 function as preliminary inflating portions. As a result, even if the occupant P exists in front of the airbag 2 when the airbag 2 is being inflated and deployed, the airbag 2 can be inflated along the occupant P so as to surround the occupant P while avoiding the occupant P. Therefore, even if the occupant P exists at the out of position, it is possible to reduce impact on the occupant P. In addition, the longer the crease portions 23, the larger the preliminary inflating portions, thereby making it possible to further increase the effect.

Next, the case in which the airbag 2 including the crease portions 23 is subjected to a load from a direction that is substantially perpendicular to the direction in which the crease portions 23 are formed, that is, the left-right direction of the vehicle is described. In FIG. 3(B), it is assumed that the occupant P is in a normally seated state. The occupant P exists at one side in the width direction of the inflated and deployed airbag 2, and the door 12 exists at the other side in the width direction of the inflated and deployed airbag 2. When a side of the vehicle collides, the occupant P moves towards the door 12, and the airbag 2 is sandwiched by the occupant P and the door 12, so that it receives a load from the left-right direction of the vehicle. At this time, the crease portions 23 are sewn with the base cloth 2a of the airbag 2. The sewn portions provide a tether effect of drawing in the crease portions, as a result of which the crease portions 23 are interposed between portions of the outermost layer of the airbag 2. This makes it difficult to stretch the crease portions 23. Therefore, in the airbag 2, an increase in the internal pressure caused by collision of the occupant P is adjusted by the discharge of gas from the vent hole 24, as a result of which the airbag 2 functions as an energy absorbing member and restrains the occupant P. That is, even if the crease portions 23 are formed in the airbag 2, the airbag 2 functions as a normal airbag 2 with respect to the occupant P in the normally seated state. Therefore, similarly to existing airbags, it is possible to maintain energy absorbing ability and deployment speed.

Figure 4A:
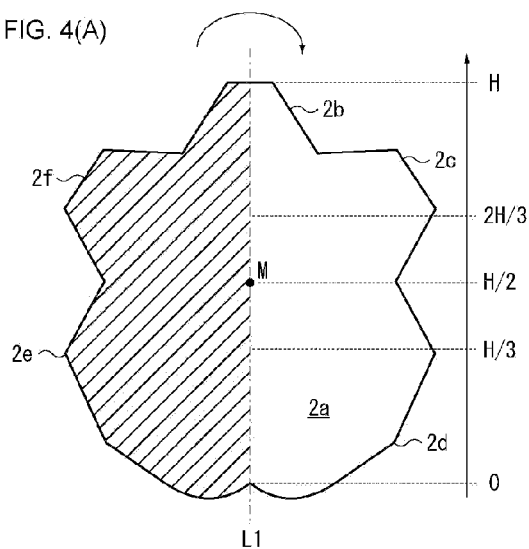
FIG. 4(A) shows a spreading step in a plane.

Next, a method for forming pleats 22 is described with reference to FIG. 4. A spreading step in a plane shown in FIG. 4(A) is a step in which the base cloth 2a forming the bag member 21 is spread in a plane. As shown in FIG. 4(A), the external shape of the base cloth 2a is a substantially star shape including five protrusions 2b to 2f. Curved portions at the lower protrusions 2d and 2e are portions that define the shape of inflation of a lower portion of the airbag 2. However, straight portions may be formed instead. Although a receding portion is formed at a location midway between the protrusions 2d and 2e, they may be continuously formed as one protrusion without the receding portion.

Figure 4B:
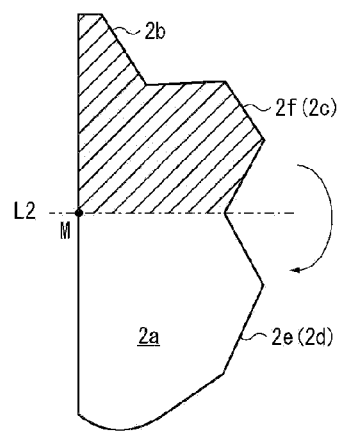
FIG. 4(B) shows a step for folding a base cloth in two.

The step for folding the base cloth 2a in two shown in FIG. 4(B) is a step in which the base cloth 2a is folded in two so as to fold down a shaded portion shown in FIG. 4(A) along a folding line L1. The folding line L1 is, for example, a center line of the base cloth 2a. By this step, the base cloth 2a is folded so that the protrusions 2c and 2f are aligned with each other and the protrusions 2d and 2e are aligned with each other. Depending upon the method for sewing the bag member 21, the folding line L1 may be displaced from the center line of the base cloth 2a. However, in this case, it is necessary to change the external shape of the base cloth 2a in accordance with the folding line L1.

Figure 4C:
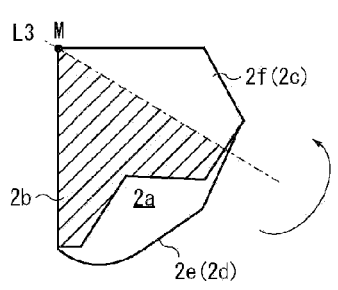
FIG. 4(C) shows a first folding step.

The first folding step shown in FIG. 4(C) is a step in which, in order to form the pleats 22, the base cloth 2a is folded so that a shaded portion in FIG. 4(B) is folded down along a folding line L2. The folding line L2 passes through a vertex M, which is positioned at a fold edge of the base cloth 2a that has been folded in two, and an intermediate point between the protrusion 2f (2c) and the protrusion 2e (2d). By this step, the protrusion 2b and the protrusion 2f (2c) are folded onto the protrusion 2e (2d). Here, the vertex M is set at an intermediate point that is situated at a length H/2 that is half a length H of the base cloth 2a in an up-down direction of the vehicle.

Figure 4D:
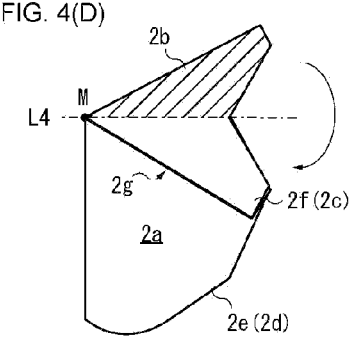
FIG. 4(D) shows a second folding step.

The second folding step shown in FIG. 4(D) is a step in which the base cloth 2a is folded so as to fold down a shaded portion in FIG. 4(C) along a folding line L3. The folding line L3 passes through the vertex M and an intermediate point of the protrusion 2f (2c). By this step, part of the protrusion 2f (2c) and the protrusion 2b are folded onto part of the protrusion 2f (2c), so that a first fold portion 2g is formed.

Figure 4E:
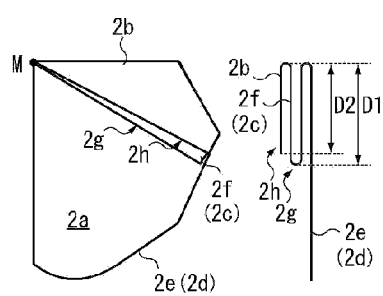
FIG. 4(E) shows a third folding step.

The third folding step shown in FIG. 4(E) is a step in which the base cloth 2a is folded so as to fold down a shaded portion in FIG. 4(D) along a folding line L4. The folding line L4 passes through the vertex M and an intermediate point between the protrusion 2b and the protrusion 2f (2c). By this step, the protrusion 2b is folded onto the protrusion 2f (2c), so that a second fold portion 2h is formed. As illustrated, the first fold portion 2g and the second fold portion 2h are folded upon each other so that their widths differ. The first fold portion 2g has a width D1, and the second fold portion 2h has a width D2. Although, here, the first fold portion 2g and the second fold portion 2h are formed so that D1>D2, the first fold portion 2g and the second fold portion 2h may be formed so that D2>D1. The left figure and the right figure shown in FIG. 4E are a plan view and a side view, respectively. In the side view, the base cloth 2a that has been folded in two is shown by one solid line.

Figure 4F:
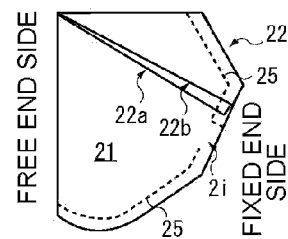
FIG. 4(F) shows a sewing step.

The sewing step shown in FIG. 4(F) is a step for forming the bag member 21 by sewing open edges of the base cloth 2a folded in the state shown in FIG. 4(E). As indicated by a broken line, a sewn portion 25 is formed by sewing an open edge of the protrusion 2e (2d) and open edges of the first fold portion 2g and the second fold portion 2h. A gap in the sewn portion 25 constitutes a gas supply opening 2i for supplying gas of the inflator 3. By this step, the bag member 21 is formed, and two pleats 22 (a first pleat 22a and a second pleat 22b) are formed by the first fold portion 2g and the second fold portion 2h.

Since the width D1 of the first fold portion 2g and the width D2 of the second fold portion 2h differ from each other, the widths of the pleats 22 (the first pleat 22a and the second pleat 22b) differ from each other. By forming the pleats 22 with different widths in this way, the number of folds of the base cloth 2a can be changed in stages (here, it changes from two to six to eight), so that it is possible to eliminate portions that suddenly become thick or thin and to reduce the effort required in the sewing operation.

The sewn portion 25 that forms the pleats 22 concurrently serves as a sewn portion 25 that forms the bag member 21. Therefore, it is possible to form both the pleats 22 and the bag member 21 by one sewing operation, thereby making it possible to simplify the sewing step and to increase the efficiency of the sewing operation.

As described above, the pleats 22 are formed by folding the base cloth 2a in two, and then folding back and forth and sewing open edges of the base cloth 2a so that the vertex M is formed at a central portion at the fold edge of the base cloth 2a. The pleats 22 form part of the bag member 21, and gas can also be supplied into the pleats 22. Outer peripheral portions of the pleats 22 are stitched by the sewn portion 25. Therefore, when gas has been supplied into the fold portions of the pleats 22, the sewn portion 25 acts as a type of tether, so that the outer peripheral portions of the pleats 22 are drawn towards the inner side of the airbag 2. As a result, when the airbag 2 has been inflated and deployed, the crease portions 23 are formed with the sewn portion 25 at the pleats 22 being a base point. By forming such pleats 22, it is possible to easily form the crease portions 23 extending in the front-back direction of the vehicle by inflating and deploying the airbag 2 so that the pleats are wound during the inflation and deployment of the airbag 2.

As shown in FIG. 4(F), the sewn portion 25 that forms the pleats 22 is inclined towards a free end from a fixed end of the bag member 21. By such a structure, when the airbag 2 is inflated and deployed, a portion of the base cloth 2a can be pushed in towards the inner side of the bag member 21, and the crease portions 23 can be easily formed by a three-dimensional tether effect of the sewn portion 25. In addition, by adjusting the inclination angle, the length and depth of each crease portions 23 can be adjusted. The inclined sewn portion 25 is formed by sewing a receding portion that is located between the protrusion 2b and the protrusion 2f (2c) and a receding portion that is located between the protrusion 2f(2c) and the protrusion 2e (2d). Therefore, in order to cause the sewn portion 25 to incline towards the free end side, the external shape of the base cloth 2a is a substantially star shape as shown in FIG. 4(A). That is, by forming the base cloth 2a with a substantially star shape, it is possible to prevent wasteful portions of the base cloth 2a from being provided.

In the description above, the vertex M is set at the intermediate point at the length H/2. As shown in FIG. 4(A), the vertex M is set, for example, in a central region (region from H/3 to 2H/3) of three equally divided regions in the length H of the base cloth 2a in the up-down direction of the vehicle. That is, the central portion where the vertex M is formed refers to this central region. The vertex M is positioned considering, for example, the shape of the inflated and deployed airbag 2 and the depth of the pleats 22. By adjusting the position of the vertex M, the crease portions 23 that are in accordance with, for example, the capacity and type of airbag 2 and the vehicle type can be formed.

As shown in FIG. 4(E), the bag member 21 including the pleats 22 is folded to approximately ¼ the size of the base cloth 2a shown in FIG. 4(A), with the area when the bag member 21 is spread in a plane after the bag member 21 including the pleats 22 has been formed being 0.25 to 0.35 times the area when the base cloth 2a is spread in a plane before the bag member 21 is formed. The area of the bag member 21 including the pleats 22 is a value that is greater than 0.25 (=¼) times the area of the base cloth 2a in consideration of the case in which the areas of the protrusions 2d and 2e are greater than the areas of the protrusions 2b, 2c, and 2f. In this way, the area of the bag member 21 including the pleats 22 is set (reduced) to within a predetermined range of the area of the original base cloth 2a, so that the crease portions 23 suitable for the capacity of the airbag 2 can be easily formed.

Figure 5A:
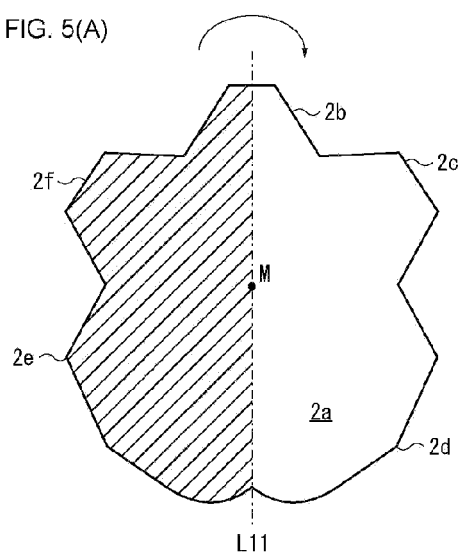
FIG. 5(A) shows a spreading step in a plane.
Figure 5B:
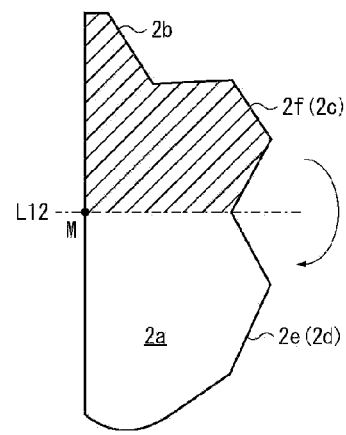
FIG. 5(B) shows a step for folding a base cloth in two.
Figure 5C:
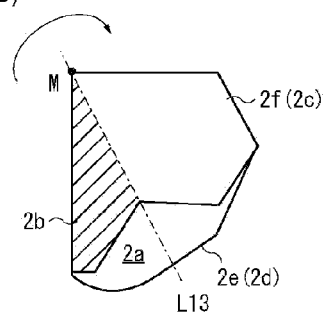
FIG. 5(C) shows a first folding step.
Figure 5D:
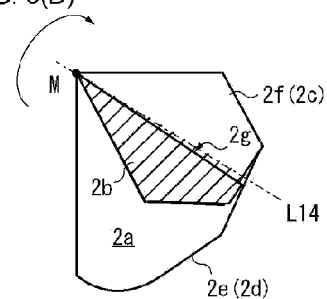
FIG. 5(D) shows a second folding step.
Figure 5E:
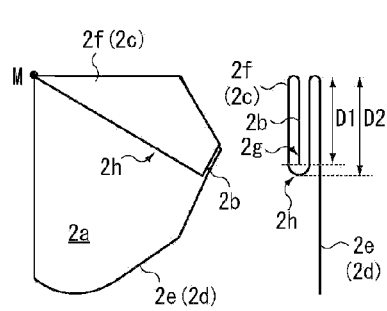
FIG. 5(E) shows a third folding step.
Figure 5F:
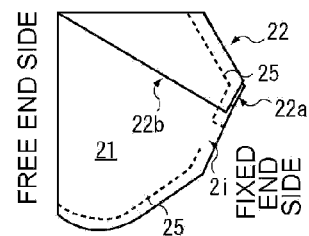
FIG. 5(F) shows a sewing step.

Next, modifications of the method for forming pleats 22 are described with reference to FIGS. 5 to 9. Here, FIG. 5 shows a first modification of the method for forming pleats, wherein FIG. 5(A) shows a spreading step in a plane, FIG. 5(B) shows a step for folding a base cloth 2a in two, FIG. 5(C) shows a first folding step, FIG. 5(D) shows a second folding step, FIG. 5(E) shows a third folding step, and FIG. 5(F) shows a sewing step. Portions corresponding to those in the method for forming pleats shown in FIG. 4 are not described when appropriate.

The spreading step in a plane shown in FIG. 5(A) is a step in which the base cloth 2a including protrusions 2b to 2f is spread in a plane. The step for folding the base cloth 2a in two shown in FIG. 5(B) is a step in which the base cloth 2a is folded in two so as to fold down a shaded portion shown in FIG. 5(A) along a line L11. The folding line L11 is, for example, a center line of the base cloth 2a. The first folding step shown in FIG. 5(C) is a step in which the base cloth 2a is folded so as to fold down a shaded portion shown in FIG. 5(B) along a folding line L12. The folding line 12 passes through a vertex M and an intermediate point that is situated between the protrusion 2f (2c) and the protrusion 2e (2d). The steps up to this point are the same as those in the embodiment shown in FIG. 4.

The second folding step shown in FIG. 5(D) is a step in which the base cloth 2a is folded so as to fold down a shaded portion shown in FIG. 5(C) along a folding line L13. The folding line L13 passes through the vertex M and an intermediate point that is situated between the protrusion 2f (2c) and the protrusion 2b. By this step, the protrusion 2b is folded onto the protrusion 2f (2c), so that a first fold portion 2g is formed.

The third folding step shown in FIG. 5(E) is a step in which the base cloth 2a is folded so as to fold down a shaded portion in FIG. 5(D) along a folding line L14. The folding line L14 passes through the vertex M and an intermediate point of the protrusion 2f(2c). By this step, the protrusion 2b is interposed in between the protrusion 2f(2c), so that a second fold portion 2h is formed by the protrusion 2f (2c). As illustrated, the first fold portion 2g and the second fold portion 2h are folded upon each other so that their widths D1 and D2 differ from each other. The left figure and the right figure shown in FIG. 5E are a plan view and a side view, respectively. In the side view, the base cloth 2a that has been folded in two is shown by one solid line.

The sewing step shown in FIG. 5(F) is a step for forming a bag member 21 by sewing open edges of the base cloth 2a folded in the state shown in FIG. 5(E). As shown by the broken line, a sewn portion 25 is formed by sewing an open edge of the protrusion 2e (2d) and sewing open edges of the first fold portion 2g and the second fold portion 2h. By this step, the bag member 21 is formed and two pleats 22 (a first pleat 22a and a second pleat 22b) are formed by the first fold portion 2g and the second fold portion 2h.

Figure 6A:
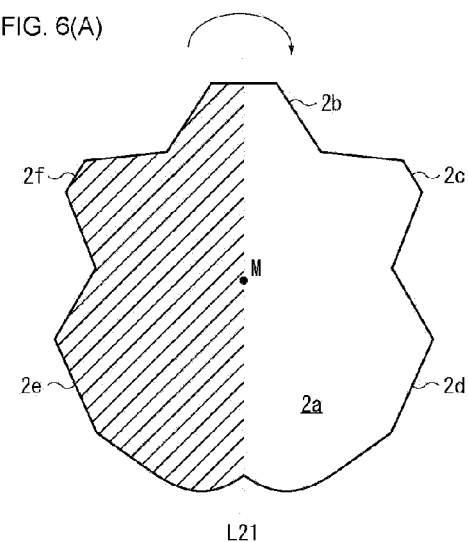
FIG. 6(A) shows a spreading step in a plane.
Figure 6B:
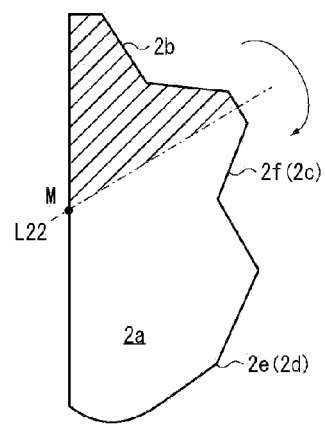
FIG. 6(B) shows a step for folding a base cloth in two.
Figure 6C:
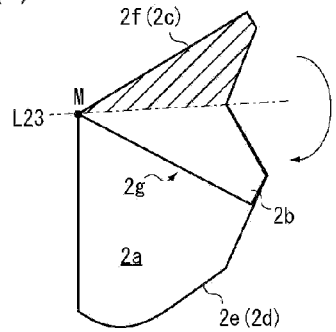
FIG. 6(C) shows a first folding step.
Figure 6D:
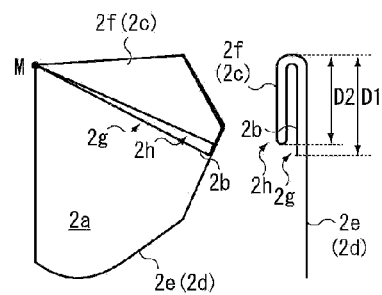
FIG. 6(D) shows a second folding step.
Figure 6E:
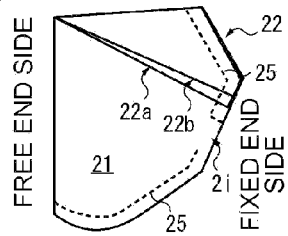
FIG. 6(E) shows a sewing step.

FIG. 6 shows a second modification of the method for forming pleats, wherein FIG. 6(A) shows a spreading step in a plane, FIG. 6(B) shows a step for folding a base cloth 2a in two, FIG. 6(C) shows a first folding step, FIG. 6(D) shows a second folding step, and FIG. 6(E) shows a sewing step. Portions corresponding to those in the method for forming pleats shown in FIG. 4 are not described when appropriate.

The spreading step in a plane shown in FIG. 6(A) is a step in which the base cloth 2a including protrusions 2b to 2f is spread in a plane. The step for folding the base cloth 2a in two shown in FIG. 6(B) is a step in which the base cloth 2a is folded in two so as to fold down a shaded portion shown in FIG. 6(A) along a line L21. The folding line L21 is, for example, a center line of the base cloth 2*a*. The steps up to this point are the same as those in the embodiment shown in FIG. 4.

The first folding step shown in FIG. 6(C) is a step in which the base cloth 2*a* is folded so as to fold down a shaded portion shown in FIG. 6(B) along a folding line L22. The folding line 22 passes through a vertex M and an intermediate point of the protrusion 2*f* (2*c*). By this step, the protrusion 2*b* is folded onto the protrusion 2*f* (2*c*) and the protrusion 2*e* (2*d*), so that a first fold portion 2*g* is formed.

The second folding step shown in FIG. 6(D) is a step in which the base cloth 2*a* is folded so as to fold down a shaded portion in FIG. 6(C) along a folding line L23. The folding line L23 passes through the vertex M and an intermediate point that is situated between the protrusion 2*b* and the protrusion 2*f* (2*c*). By this step, part of the protrusion 2*f*(2*c*) is folded onto the protrusion 2*b*, so that a second fold portion 2*h* is formed. As illustrated, the first fold portion 2*g* and the second fold portion 2*h* are folded upon each other so that their widths D1 and D2 differ from each other. The left figure and the right figure shown in FIG. 6(D) are a plan view and a side view, respectively. In the side view, the base cloth 2*a* that has been folded in two is shown by one solid line.

The sewing step shown in FIG. 6(E) is a step for forming a bag member 21 by sewing open edges of the base cloth 2*a* folded in the state shown in FIG. 6(D). As shown by the broken line, a sewn portion 25 is formed by sewing an open edge of the protrusion 2*e* (2*d*) and sewing open edges of the first fold portion 2*g* and the second fold portion 2*h*. By this step, the bag member 21 is formed and two pleats 22 (a first pleat 22*a* and a second pleat 22*b*) are formed by the first fold portion 2*g* and the second fold portion 2*h*.

Figure 7A:
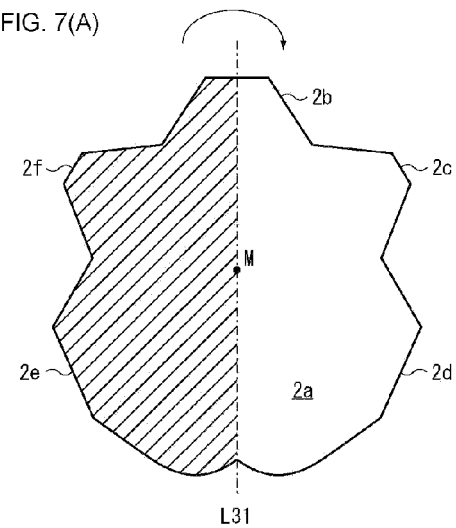
FIG. 7(A) shows a spreading step in a plane.
Figure 7B:
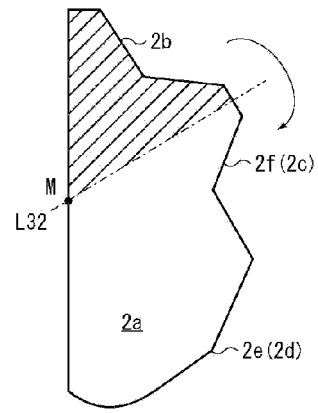
FIG. 7(B) shows a step for folding a base cloth in two.
Figure 7C:
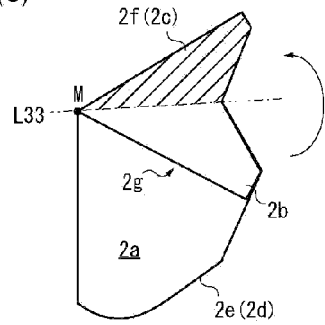
FIG. 7(C) shows a first folding step.
Figure 7D:
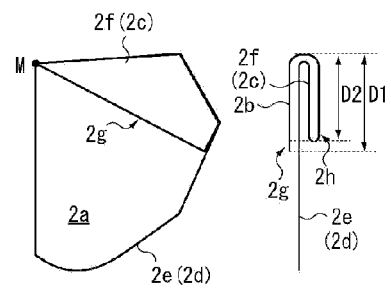
FIG. 7(D) shows a second folding step.
Figure 7E:
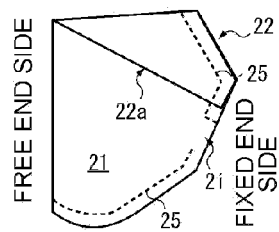
FIG. 7(E) shows a sewing step.

FIG. 7 shows a third modification of the method for forming pleats, wherein FIG. 7(A) shows a spreading step in a plane, FIG. 7(B) shows a step for folding a base cloth 2*a* in two, FIG. 7(C) shows a first folding step, FIG. 7(D) shows a second folding step, and FIG. 7(E) shows a sewing step. Portions corresponding to those in the method for forming pleats shown in FIG. 4 are not described when appropriate.

The spreading step in a plane shown in FIG. 7(A) is a step in which the base cloth 2*a* including protrusions 2*b* to 2*f* is spread in a plane. The step for folding the base cloth 2*a* in two shown in FIG. 7(B) is a step in which the base cloth 2*a* is folded in two so as to fold down a shaded portion shown in FIG. 7(A) along a line L31. The folding line L31 is, for example, a center line of the base cloth 2*a*. The steps up to this point are the same as those in the embodiment shown in FIG. 4.

The first folding step shown in FIG. 7(C) is a step in which the base cloth 2*a* is folded so as to fold down a shaded portion in FIG. 7(B) along a folding line L32. The folding line 32 passes through a vertex M and an intermediate point of the protrusion 2*f* (2*c*). By this step, the protrusion 2*b* is folded onto the protrusion 2*f*(2*c*) and the protrusion 2*e* (2*d*), so that a first fold portion 2*g* is formed.

The second folding step shown in FIG. 7(D) is a step in which the base cloth 2*a* is folded so as to fold down a shaded portion in FIG. 7(C) along a folding line L33. The folding line L33 passes through the vertex M and an intermediate point that is situated between the protrusion 2*b* and the protrusion 2*f* (2*c*). By this step, the protrusion 2*f* (2*c*) is folded to the back side of the protrusion 2*e* (2*d*), so that a second fold portion 2*h* is formed. As illustrated, the first fold portion 2*g* and the second fold portion 2*h* are folded upon each other so that their widths D1 and D2 differ from each other. The left figure and the right figure shown in FIG. 6(D) are a plan view and a side view, respectively. In the side view, the base cloth 2*a* that has been folded in two is shown by one solid line.

The sewing step shown in FIG. 7(E) is a step for forming a bag member 21 by sewing open edges of the base cloth 2*a* folded in the state shown in FIG. 7(D). As shown by the broken line, a sewn portion 25 is formed by sewing an open edge of the protrusion 2*e* (2*d*) and sewing open edges of the first fold portion 2*g* and the second fold portion 2*h*. By this step, the bag member 21 is formed and pleats 22, one at the front and one at the back, are formed by the first fold portion 2*g* and the second fold portion 2*h*.

FIG. 8 shows a fourth modification of the method for forming pleats, wherein FIG. 8(A) shows a spreading step in a plane, FIG. 8(B) shows a step for folding a base cloth 2*a* in two, FIG. 8(C) shows a first folding step, FIG. 8(D) shows a second folding step, FIG. 8(E) shows a third folding step, and FIGS. 8(F) and 8(G) show sewing steps. Portions corresponding to those in the method for forming pleats shown in FIG. 4 are not described when appropriate.

The spreading step in a plane shown in FIG. 8(A) is a step in which the base cloth 2*a* that forms a bag member 21 is spread in a plane. As illustrated, the external shape of the base cloth 2*a* is a circular shape that does not include protrusions. The external shape of the base cloth 2*a* may be an elliptical shape or a polygonal shape as long as it does not include protrusions. The fourth modification is achieved by changing the external shape of the base cloth 2*a* according to the first embodiment from a substantially star shape to a circular shape. The subsequent steps are essentially the same as those according to the first embodiment.

The step for folding the base cloth 2*a* in two shown in FIG. 8(B) is a step in which the base cloth 2*a* is folded in two so as to fold down a shaded portion shown in FIG. 8(A) along a folding line L41. The folding line L41 is, for example, a center line of the base cloth 2*a*.

The first folding step shown in FIG. 8(C) is a step in which, in order to form the pleats 22, the base cloth 2*a* is folded so as to fold down a shaded portion in FIG. 8(B) along a folding line L42. The folding line L42 passes through a vertex M, which is positioned at a fold edge of the base cloth 2*a* that has been folded in two, and is substantially perpendicular to the folding line L41. By this step, the base cloth 2*a* is folded in four.

The second folding step shown in FIG. 8(D) is a step in which the base cloth 2*a* is folded so as to fold down a shaded portion in FIG. 8(C) along a folding line L43. The folding line L43 passes through the vertex M, and is set at an angle φ which is slightly larger than ⅓ of a central angle θ from the folding line L42. By adjusting the size of the angle φ it is possible to adjust, for example, the width, the overlapping amount, and the number of pleats 22. The relationship φ>θ/3 is merely one example. The relationship between the central angle θ and the angle φ is changed as appropriate in accordance with, for example, the number of pleats 22 and widths of the pleats 22 to be formed. By this step, a first fold portion 2*g* is formed.

The third folding step shown in FIG. 8(E) is a step in which the base cloth 2*a* is folded so as to fold down a shaded portion in FIG. 8(D) along a folding line L44. The folding line L44 passes through the vertex M and is substantially perpendicular to the folding line L41. By this step, a second fold portion 2*h* having a width that is less than the width of the first fold portion 2*g* is formed on the first fold portion 2*g*.

The sewing step shown in FIG. 8(F) is a step for forming the bag member 21 by sewing open edges of the base cloth 2*a* folded in the state shown in FIG. 8(E). As shown by the broken line, a sewn portion 25 is formed by sewing the base cloth 2a into a substantially arc shape. By this step, the bag member 21 is formed and two pleats 22 (a first pleat 22a and a second pleat 22b) are formed by the first fold portion 2g and the second fold portion 2h.

The sewing step shown in FIG. 8(G) is a step in which the sewn portion 25 that forms the pleats 22 is inclined towards a free end from a fixed end of the bag member 21. By causing the sewn portion 25 to be inclined in this way, a portion of the base cloth 2a can be pushed in towards the inner side of the bag member 21 when the airbag is inflated and deployed, and crease portions 23 can be easily formed by a three-dimensional tether effect of the sewn portion 25. For example, the inclination angle is arbitrarily set between that of the sewn portion 25 shown in FIG. 8(F) and that of the sewn portion 25 shown in FIG. 8(G). A shaded portion in FIG. 8(G) is an excessive portion 2j, which may be left as it is, may be cut off, or may be folded upon and sewn together with the sewn portion 25.

Figure 9A:
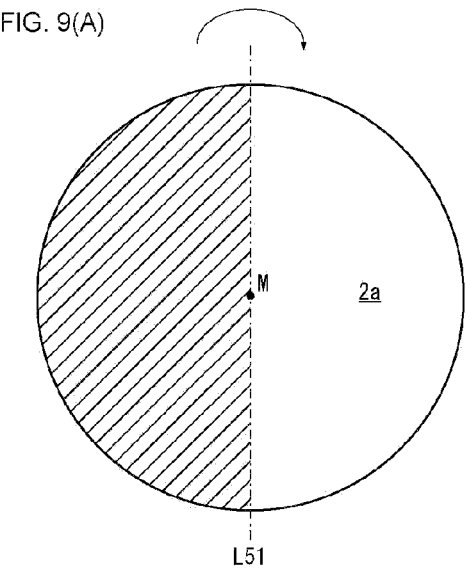
FIG. 9(A) shows a spreading step in a plane.
Figure 9B:
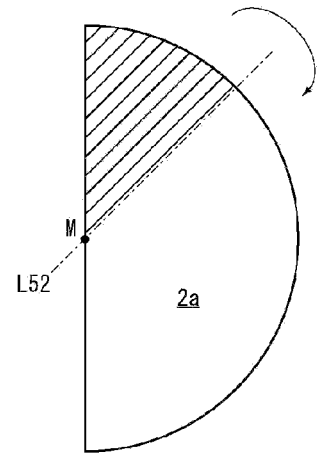
FIG. 9(B) shows a step for folding a base cloth in two.
Figure 9C:
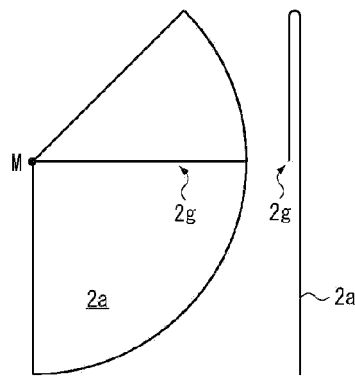
FIG. 9(C) shows a first folding step.
Figure 9D:
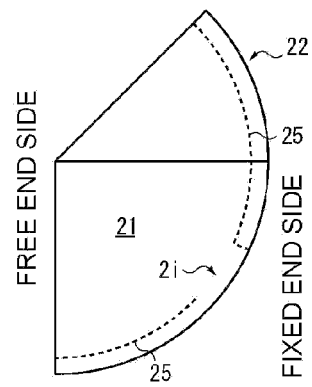
FIG. 9(D) shows a sewing step.

FIG. 9 shows a fifth modification of the method for forming pleats, wherein FIG. 9(A) shows a spreading step in a plane, FIG. 9(B) shows a step for folding a base cloth 2a in two, FIG. 9(C) shows a first folding step, and FIG. 9(D) shows a sewing step. Portions corresponding to those in the method for forming pleats shown in FIGS. 4 and 8 are not described when appropriate.

The spreading step in a plane shown in FIG. 9(A) is a step in which a base cloth 2a that forms a bag member 21 is spread in a plane. As illustrated, the external shape of the base cloth 2a is a circular shape as in the fourth modification. In the fifth modification, using the base cloth 2a according to the fourth modification, one pleat 22 is formed.

The step for folding the base cloth 2a in two shown in FIG. 9(B) is a step in which the base cloth 2a is folded in two so as to fold down a shaded portion shown in FIG. 9(A) along a line L51. The folding line L51 is, for example, a center line of the base cloth 2a.

The first folding step shown in FIG. 9(C) is a step in which the base cloth 2a is folded so as to fold down a shaded portion in FIG. 9(B) along a folding line L52. The folding line L52 passes through a vertex M, which is positioned at a fold edge of the base cloth 2a that has been folded in two, and is set at an angle of, for example, 22.5 degrees from the folding line L51. By this step, the base cloth 2a is folded to a size that is ⅜ of its original size, so that a first fold portion 2g is formed. The set angle of the folding line L52 can be changed as appropriate in accordance with the width of the pleat 22 to be formed.

The sewing step shown in FIG. 9(D) is a step for forming the bag member 21 by sewing open edges of the base cloth 2a folded in the state shown in FIG. 9(C). As shown by the broken line, a sewn portion 25 is formed by sewing the base cloth 2a into a substantially arc shape. By this step, the bag member 21 is formed and one pleat 22 is formed by the first fold portion 2g. As shown in FIG. 8(G), the sewn portion 25 that forms the pleat 22 may be inclined towards a free end.

Even if the bag members 21 formed by the methods for forming pleats according to the first to fourth modifications and the method for forming a pleat according to the fifth modification include pleats 22 or a pleat 22 having different structures, when any of them is installed in the airbag device 1, essentially the same advantageous effects as those provided by the airbag 2 according to the first embodiment are provided.

Figure 10A:
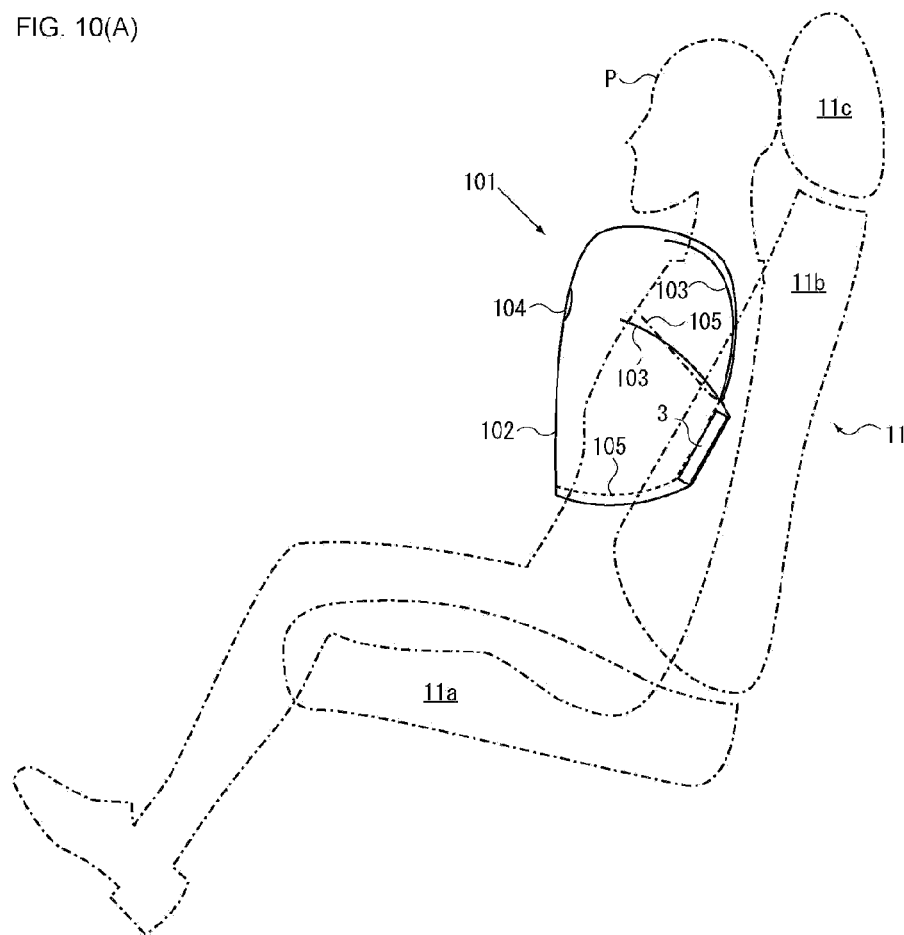
FIG. 10(A) is a schematic side view showing an inflated and deployed state.
Figure 10B:
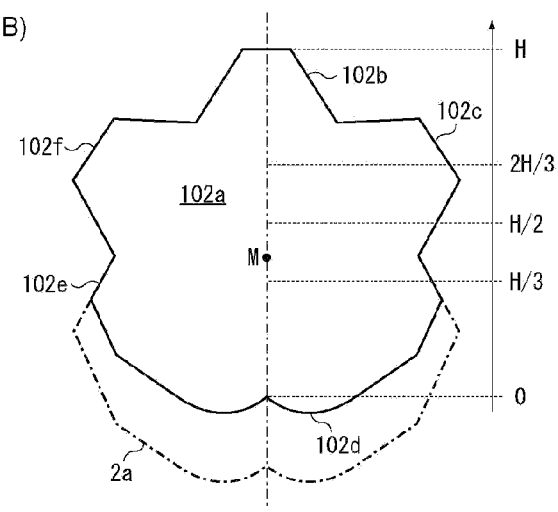
FIG. 10(B) is a plan view of a base cloth that forms an airbag and that is spread.
Figure 11A:
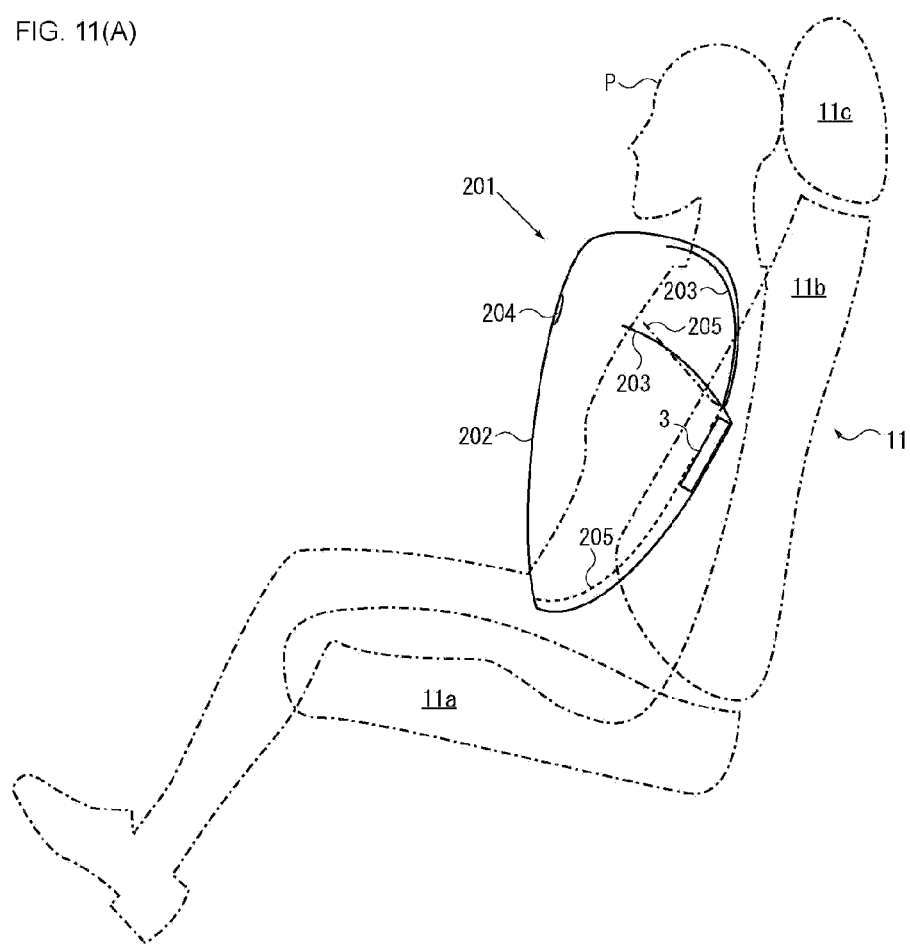
FIG. 11(A) is a schematic side view showing an inflated and deployed state.
Figure 11B:
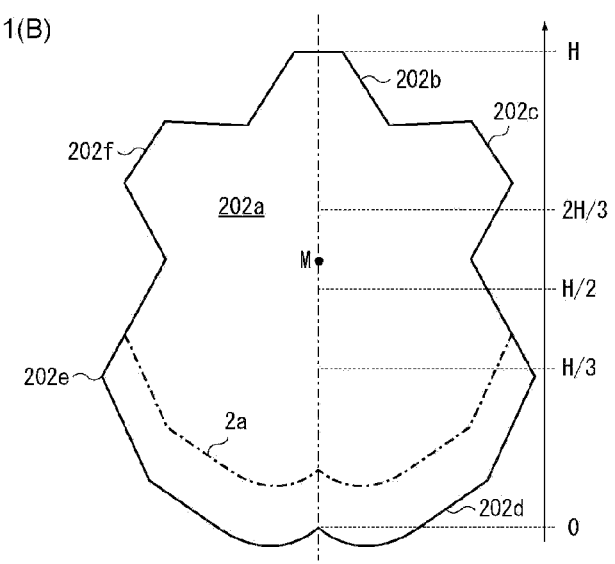
FIG. 11(B) is a plan view of a base cloth that forms an airbag and that is spread.

Next, airbag devices according to other embodiments of the present invention are described with reference to FIGS. 10 and 11. FIG. 10 shows an airbag device according to a second embodiment of the present invention, wherein FIG. 10(A) is a schematic side view showing an inflated and deployed state, and FIG. 10(B) is a plan view of a base cloth that forms an airbag and that is spread. FIG. 11 shows an airbag device according to a third embodiment of the present invention, wherein FIG. 11(A) is a schematic side view showing an inflated and deployed state, and FIG. 11(B) is a plan view of a base cloth that forms an airbag and that is spread. Structural components corresponding to those of the airbag device 1 according to the first embodiment shown in FIG. 1 are given the same reference numerals, and the same descriptions are not given.

As shown in FIG. 10(A), an airbag device 101 according to the second embodiment includes an airbag 102 having a size that corresponds to the size from the shoulder to chest of an occupant P when the airbag 102 is inflated and deployed. Even in such an airbag 102, similarly to the airbag 2 according to the above-described first embodiment, it is possible to form pleats and crease portions 103 when the airbag 102 is inflated and deployed. Therefore, even the airbag 102 for the shoulder and chest and the airbag device 101 according to the second embodiment provide advantageous effects that are the same as those of the first embodiment. The pleats and the bag member forming the airbag 102 are formed by a sewn portion 105, and the crease portions 103 are formed by the sewn portion 105 when the airbag 102 is inflated and deployed. A vent hole 104 is formed in the front of the airbag 102.

When, as shown in FIG. 10(B), a base cloth 102a that forms the airbag 102 according to the second embodiment is spread in a plane, if the base cloth 2a that forms the airbag 2 according to the first embodiment is shown by an alternate long and short dashed line, protrusions 102d and 102e have shapes that are contracted from the base cloth 2a. Here, the case in which the base cloth 102a that forms the airbag 102 is such that the position of a vertex M, serving as a base point when the pleats are formed, is the same as that of the base cloth 2a that forms the airbag 2 is considered. Since the vertex M is included in a central region (range from H/3 to 2H/3) of three equally divided regions in a length H of the base cloth 102a in an up-down direction, the length H of the base cloth 102a in the up-down direction can be reduced up to where the position of the vertex M coincides with the position at the length H/3 in the up-down direction. That is, the length H of the base cloth 102a in the up-down direction can be reduced to a size that is ¾ of the length H of the base cloth 2a in the up-down direction. The vertex M of the base cloth 102a may be set at an intermediate point at a length H/2 of the length H of the base cloth 102a in the up-down direction.

As shown in FIG. 11(A), an airbag device 201 according to the third embodiment includes an airbag 202 having a size that corresponds to the size from the shoulder to hip of an occupant P when the airbag 202 is inflated and deployed. Even in such an airbag 202, similarly to the airbag 2 according to the above-described first embodiment, it is possible to form pleats and crease portions 103 when the airbag 102 is inflated and deployed. Therefore, even the airbag 202 for the shoulder, chest, stomach, and hip and the airbag device 201 according to the third embodiment provide advantageous effects that are the same as those of the first embodiment. The pleats and the bag member forming the airbag 202 are formed by a sewn portion 205, and crease portions 103 are formed by the sewn portion 205 when the airbag 202 is inflated and deployed. A vent hole 204 is formed in the front of the airbag 202.

When, as shown in FIG. 11(B), a base cloth 202a that forms the airbag 202 according to the third embodiment is spread in a plane, if the base cloth 2a that forms the airbag 2 according to the first embodiment is shown by an alternate long and short dashed line, protrusions 202d and 202e have shapes that are expanded from the base cloth 2a. Here, the case in which the base cloth 202a that forms the airbag 202 is such that the position of a vertex M, serving as a base point when the pleats are formed, is the same as that of the base cloth 2a that forms the airbag 2 is considered. Since the vertex M is included in a central region (range from H/3 to 2H/3) of three equally divided regions in a length H of the base cloth 202a in an up-down direction, the length H of the base cloth 202a in the up-down direction can be increased up to where the position of the vertex M coincides with the position at the length 2H/3 in the up-down direction. That is, the length H of the base cloth 202a in the up-down direction can be increased to a size that is ⅔ of the length H of the base cloth 2a in the up-down direction. The vertex M of the base cloth 202a may be set at an intermediate point at a length H/2 of the length H of the base cloth 202a in the up-down direction.

In the first to third embodiments according to the invention described above, the pleats may be called gathered portions, tucks, folds, folded-over portions, folded-up portions, or superposed portions, and refer to everything that is formed by folding the base cloth 2a, the base cloth 102a, or the base cloth 202a and sewing an outer periphery of an open edge thereof.

In the above-described embodiments, the cases in which the present invention is applied to a side airbag device are described. However, as long as the airbag device is capable of having the same structure, the present invention is applicable to, for example, a driver airbag device, a passenger airbag device, a curtain airbag device, a knee airbag device, and an airbag for pedestrians.

The present invention is not limited to the above-described embodiments. Obviously, the present invention can be variously changed within a scope that does not depart from the gist of the present invention, such as selecting as appropriate and applying the method for forming pleats 22 of any one of the first to fifth modifications to the airbag 2 according to the second or third embodiment.

REFERENCE SIGNS LIST 1, 101, 201 airbag device
2, 102, 202 airbag
2a, 102a, 202a base cloth
2b, 2c, 2d, 2e, 2f, 102d, 102e, 202d, 202e protrusion
2g first fold portion
2h second fold portion
2i gas supply opening
2j excessive portion
3 inflator
4 airbag case
11 seat
11a sitting portion
11b seat back
11c head rest
11d expected cleavage portion
12 door
21 bag member
22 pleat
22a first pleat
22b second pleat
23, 103, 203 crease portion
23a first crease portion
23b second crease portion
23c third crease portion
24 vent hole
25 sewn portion

What is claimed is:

1. An airbag that is normally folded and accommodated in a structural member of a vehicle and that is inflated and deployed by a supply of gas in an emergency, the airbag comprising:
   a bag member that is formed of a base cloth; and
   a pleat or a plurality of pleats that are formed at the bag member,
   wherein the pleat or pleats have a crease portion in a front-back direction of the vehicle to allow the gas to escape to the crease portion upon loading from the front-back direction of the vehicle when the bag member is inflated and deployed, and wherein the pleat or pleats are formed by folding the base of the cloth in two, and then folding back and forth and sewing an open edge of the base cloth so that a vertex is formed at a central portion at a fold edge of the base cloth.

2. The airbag according to claim 1, wherein the pleats are formed to have widths different from each other when the airbag has the plurality of pleats.

3. The airbag according to claim 1, wherein a sewn portion that forms the pleat or pleats is inclined towards a free end from a fixed end of the bag member.

4. The airbag according to claim 1, wherein a sewn portion that forms the pleat or pleats concurrently serves as a sewn portion that forms the bag member.

5. The airbag according to claim 1, wherein the vertex is included in a central region of three equally divided regions in a length of the base cloth in an up-down direction of the vehicle.

6. The airbag according to claim 1, wherein an external shape of the base cloth is a substantially star shape.

7. The airbag according to claim 1, wherein an area when the bag member is spread in a plane after the bag member including the pleat or pleats has been formed is 0.25 to 0.35 times an area when the base cloth is spread in a plane before the bag member is formed.

8. The airbag according to claim 1, wherein the crease portion has a length that is greater than or equal to half a length of the inflated and deployed bag member in the front-back direction of the vehicle.

9. The airbag according to claim 1, wherein the bag member is used as a side airbag that is inflated and deployed at a location between an occupant and a door of the vehicle.

10. An airbag device comprising an airbag that is normally folded and accommodated in a structural member of a vehicle and that is inflated and deployed in an emergency; and an inflator that supplies gas to the airbag, wherein the airbag comprises the airbag of claim 1.

* * * * *